(12) United States Patent
Vo

(10) Patent No.: US 10,369,509 B2
(45) Date of Patent: Aug. 6, 2019

(54) FILTER ASSEMBLY COVER WITH INTEGRATED SENSORS

(71) Applicant: PAT TECHNOLOGY SYSTEMS INC., Vaudreuil-Dorion (CA)

(72) Inventor: Chau Thien Vo, Roxboro (CA)

(73) Assignee: PAT TECHNOLOGY SYSTEMS INC., Vaudreuil-Dorion, Quebec (CA)

( * ) Notice: Subject to any disclaimer, the term of this patent is extended or adjusted under 35 U.S.C. 154(b) by 260 days.

(21) Appl. No.: 15/588,766

(22) Filed: May 8, 2017

(65) Prior Publication Data

US 2017/0320005 A1 Nov. 9, 2017

Related U.S. Application Data

(60) Provisional application No. 62/333,508, filed on May 9, 2016.

(51) Int. Cl.
| | |
|---|---|
| *B01D 46/44* | (2006.01) |
| *F24F 3/16* | (2006.01) |
| *B01D 46/00* | (2006.01) |

(52) U.S. Cl.
CPC ....... *B01D 46/442* (2013.01); *B01D 46/0004* (2013.01); *B01D 46/0023* (2013.01); *B01D 46/444* (2013.01); *B01D 46/446* (2013.01); *B01D 46/448* (2013.01); *F24F 3/1603* (2013.01); *B01D 2265/02* (2013.01); *B01D 2273/30* (2013.01)

(58) Field of Classification Search
CPC .............. B01D 46/0004; B01D 46/442; B01D 46/444; B01D 46/446; B01D 46/448; B01D 46/0086; B01D 46/0023; B01D 2273/30; B01D 2265/02; F24F 3/1603
See application file for complete search history.

(56) References Cited

U.S. PATENT DOCUMENTS

| | | | |
|---|---|---|---|
| 4,174,204 A | 11/1979 | Chase | |
| 4,443,235 A | 4/1984 | Brenholt et al. | |
| 4,787,922 A * | 11/1988 | Kulitz | B01D 46/002 55/356 |
| 4,838,910 A | 6/1989 | Stollenwerk et al. | |
| 5,984,991 A | 11/1999 | Glucksman | |
| 7,520,925 B2 | 4/2009 | Sisk et al. | |
| 2008/0017031 A1 | 1/2008 | Vo | |
| 2012/0137876 A1* | 6/2012 | Miller | B01D 46/0043 95/23 |
| 2017/0197172 A1* | 7/2017 | Vo | B01D 46/48 |

* cited by examiner

*Primary Examiner* — Robert Clemente
(74) *Attorney, Agent, or Firm* — Norton Rose Fulbright Canada LLP

(57) ABSTRACT

A filter assembly having a filter module, a fan module, an electronics module including a control system. The fan module inlet and the filter module outlet are laterally spaced apart with their corresponding surfaces extending side by side. A cover is movable between an engaged position engaging the surfaces of the filter and fan modules and a removed position. The cover defines a plenum providing a fluid communication between the filter module outlet and the fan module inlet in the engaged position and directing the flow along a direction different from a direction of the flow through the fan module inlet and filter module outlet. A sensor is located in the plenum and configured to provide information on the flow through the plenum. The sensor communicates with a power source and with the control system at least when the cover is in the engaged position.

16 Claims, 4 Drawing Sheets

FILTER ASSEMBLY COVER WITH INTEGRATED SENSORS

CROSS-REFERENCE TO RELATED APPLICATIONS

This application claims priority from U.S. provisional application No. 62/333,508 filed May 9, 2016, the entire contents of which are incorporated by reference herein.

TECHNICAL FIELD

The application relates generally to filter assemblies, more particularly to such assemblies including sensors to characterize the airflow therethrough.

BACKGROUND OF THE ART

Some prior art filter assemblies have removable electronic subassemblies, but such assemblies are typically meant to be factory installed, and require tools and specific knowledge of the technical details of the equipment and its components to remove and reinstall the electronic subassemblies as well as to disconnect and re-connect the associated wires. Also, the electronic printed circuit boards (PCBs) are typically located in the same enclosure as the electronic subassemblies, thus making them susceptible to damage from static discharge during installation if suitable anti-static tools and protocols are not employed.

SUMMARY

In one aspect, there is provided a filter assembly comprising: a filter module including a filter module inlet and a filter module outlet in fluid communication with each other through a filter, a first surface of the filter module having the filter module outlet defined therein; a fan module including a fan module inlet and a fan module outlet in fluid communication with each other through a rotatable fan, a first surface of the fan module having the fan module inlet defined therein, the first surfaces of the filter and fan modules extending side by side, and the fan module inlet and the filter module outlet being laterally spaced apart from one another; an electronics module including a control system; a cover movable between an engaged position where the cover engages the first surfaces of the filter and fan modules and a removed position away from the first surfaces, the cover defining a plenum, the cover in the engaged position providing a fluid communication between the filter module outlet and the fan module inlet through the plenum, the plenum directing a flow between the filter module outlet and the fan module inlet along a direction different from a direction of the flow through the fan module inlet and from a direction of the flow through the filter module outlet; and a sensor located in the plenum and configured to provide information on the flow through the plenum, the sensor communicating with a power source and with the control system at least when the cover is in the engaged position.

In another aspect, there is provided a filter assembly comprising: a filter module and a fan module disposed side by side; a cover movable between an engaged position where the cover engages the filter and fan modules and a removed position away from the engaged position, the cover defining a plenum, the cover in the engaged position providing a fluid communication between the filter module and the fan module through the plenum, the plenum directing a flow between the filter module and the fan module along a direction different from a direction of the flow through the fan module and from a direction of the flow through the filter module; and a sensor located in the plenum and configured to provide information on the flow through the plenum, the sensor communicating with a power source and a control system at least when the cover is in the engaged position.

DESCRIPTION OF THE DRAWINGS

Reference is now made to the accompanying figures in which.

DETAILED DESCRIPTION

Figure 1:
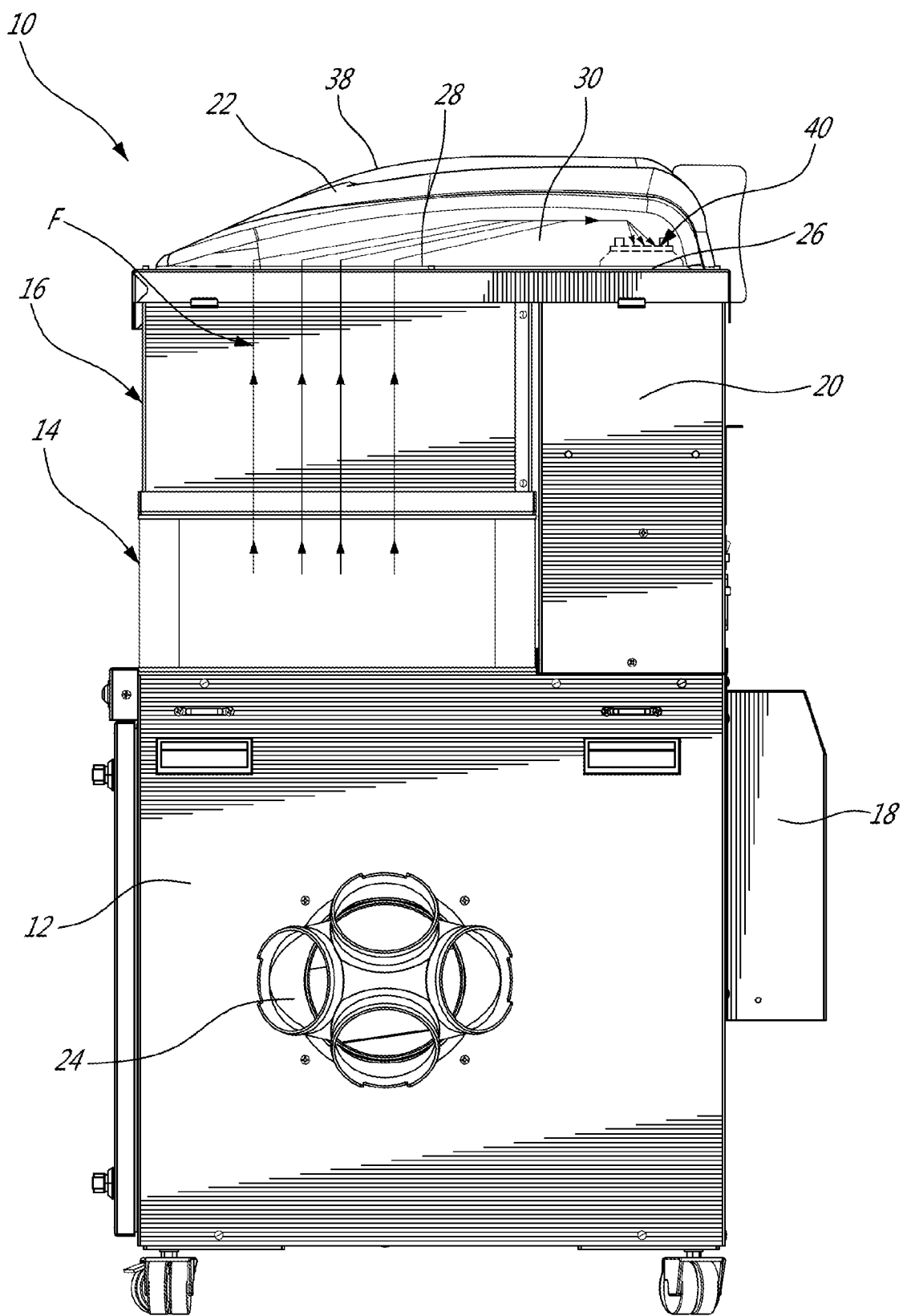
FIG. 1 is a schematic side view of a filter assembly in accordance with a particular embodiment, with a cover thereof in an engaged position.
Figure 2:
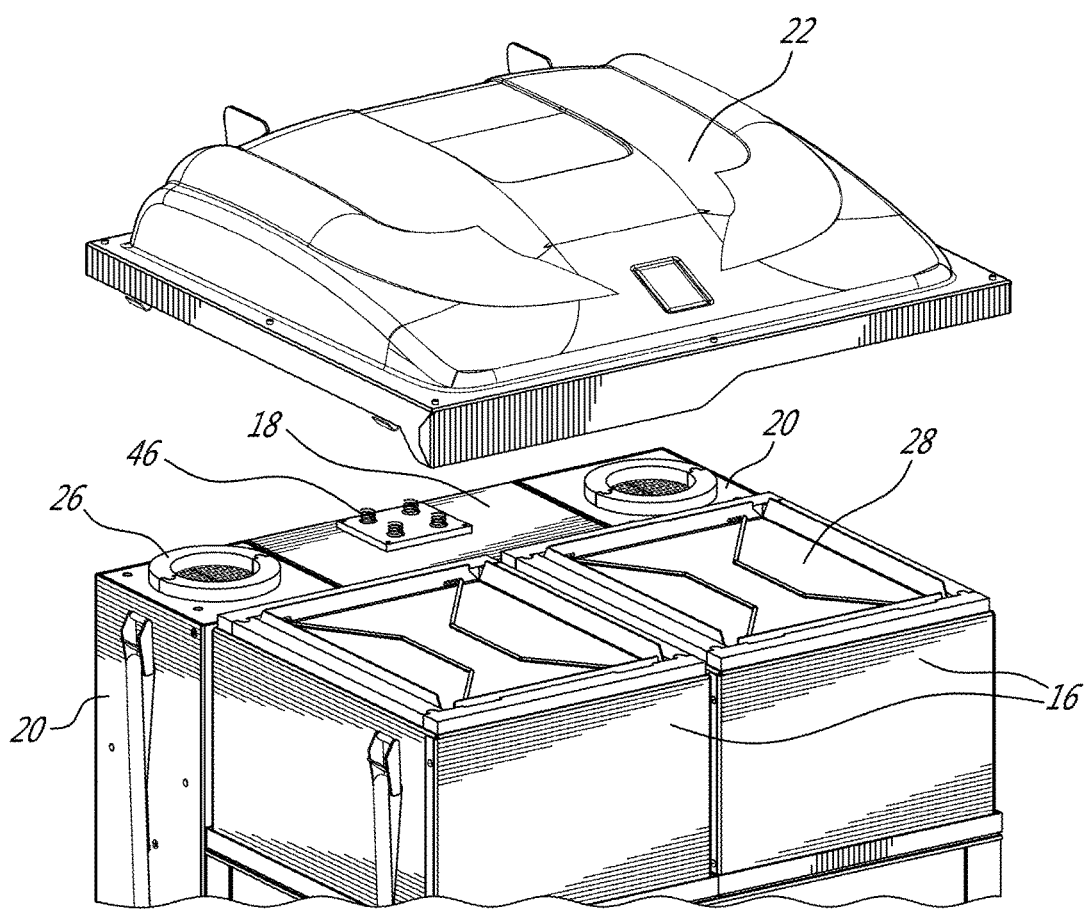
FIG. 2 is a schematic tridimensional exploded view of part of the filter assembly of FIG. 1, with the cover in the removed position.

Referring to FIGS. 1-2, a particular embodiment of a filter assembly 10 (e.g. fume extraction system) is shown. The filter assembly 10 is used to capture particulate and/or undesirable gases (e.g. toxics gases, undesirable odors, volatile organic compounds). The filter assembly 10 may be used to filter the environment of a laser marking/engraving process, a printing press, etc. Other uses are also possible.

The filter assembly 10 includes several interconnected modules: a pre-filter module 12, a particulate filter module 14, two side by side gaseous filter modules 16, an electronics/exhaust module 18, and two fan modules 20. The fan modules 20, exhaust module 18 and gaseous filter modules 16 are located side-by-side; the particulate filter module 14 is disposed over the pre-filter module 12, and the gaseous filter modules 16 are disposed side by side over the particulate filter module 14. A cover 22 is movable between an engaged position disposed over and engaged to the top surfaces of the fan modules 20, exhaust module 18 and gaseous filter modules 16 (FIG. 1) and a removed position away from the top surfaces of the modules 16, 18, 20 (FIG. 2). In the embodiment shown, the cover 22 is completely removable. Alternately, the cover 22 may remain connected to one or more of the modules in the removed position, for example through a hinged connection. Referring more particularly to FIG. 1, a filtration or working air flow F of the filter assembly 12 is defined through, in order, the pre-filter module 12, the particulate filter module 14, the gaseous filter module 16, the cover 22, the fan modules 20, and the electronics/exhaust module 18.

In a particular embodiment, all of the modules 12, 14, 16, 18, 20 are detachably interconnected such as to be removable from the remainder of the filter assembly 10.

In a particular embodiment, the pre-filter module 12 has a casing defining an enclosure containing a filter configured as a tubular a pre-filter (not shown) made of filtration material permeable to air (e.g. paper-like or plastic-sheet pleated filter material) and having an open end communicating with the inlet 24 of the filter assembly 10, so that the inlet 24 communicates with an outlet of the pre-filter module 12 through the pre-filter. Other configurations are also possible.

In a particular embodiment, the particulate filter module 14 includes a casing defining an enclosure having an inlet in fluid communication with the outlet of the pre-filter module 12, and containing a filter including suitable particulate filtration media so that the inlet and an outlet of the particulate filter module 14 are in fluid communication with one another through the filtration media. The particulate filtration media may be for example a porous material or membrane (e.g. pleated glass fibre media) where the particulates are captured between the fibers of the media. For example, the particulate filtration media may define a high-efficiency particulate arrestance (HEPA) filter. Other configurations are also possible.

In a particular embodiment, each gaseous filter module 16 has a casing defining an enclosure having an inlet in fluid communication with the outlet of the particulate filter module 14, and containing a filter including suitable adsorption filtration media so that the inlet and an outlet of the gaseous filter module 16 are in fluid communication with one another through the adsorption filtration media. In a particular embodiment, the adsorption filtration media includes granular or pelletized activated carbon within a cartridge, so that gaseous contaminants are adsorbed within the pores of the activated carbon. Other configurations are also possible.

It is understood that the configuration shown for the filter assembly 10 is exemplary only and that alternately, different filter modules 12, 14, 16, 18, different quantities of filter modules, and/or different combinations of filter modules may be used, depending on the intended use of the filter assembly 10. For example, the filter assembly 10 may include a single filter module. A single or more than two fan modules 20 may be provided. The electronics and exhaust systems may be provided in different modules. Some or all of the modules may be permanently connected to one another. Other configurations are also possible.

In the embodiment shown, each fan module 20 is detachable from the remainder of the filter assembly 10, for example by being detachably connected to the electronics/exhaust module 18. Each fan module 20 includes a casing separate from the casings of the other modules, which contains a rotatable fan (e.g. blower) and a motor driving rotation of the fan (not shown). The fan module 20 is preferably configured to define a filter flow path including an inlet and an outlet in fluid communication with each other through the fan, and through which is defined a fluid communication between the filter modules 12, 14, 16 and the electronics/exhaust module 18, and a cooling flow path for cooling of the motor. Flow through the cooling flow path may be provided by a second dedicated fan also driven by the motor.

Referring again to FIG. 1, the arrangement of the fan modules 20 relative to the filters is such that the top surfaces of the fan modules 20 and final filters (two gaseous filter modules 16 in the embodiment shown) extend side by side. In the embodiment show, the top surfaces of the fan modules 20 and of the gaseous filter modules 16, and accordingly the inlets 26 of the fan modules 20 and the outlet face 28 of the gaseous filter modules 16, are located in the same plane. The inlet 26 of each fan module 20 is thus laterally spaced apart from the outlets 28 of the gaseous filter modules 16, and communication therebetween is provided through a plenum 30 defined by the cover 22 when in the engaged position, the cover 22 being configured to diffuse the flow. The removable cover 22 disposed over the gaseous filter module 16 and fan module(s) 20 creates a compact junction that allows fluid communication from the filter outlets 28 to the fan module inlets 26, the plenum 30 creating an inverted u-shaped flow therebetween; accordingly, part of the flow in the plenum 30 circulates along a direction different from that of the flow through the fan module inlet 26 and of the flow through the gaseous filter module 16. In the embodiment shown, the flow is vertical or substantially vertical through the fan module inlet 26 and through the gaseous filter module 16, and horizontal or substantially horizontal in a part of the plenum 30 extending therebetween.

Figure 3:
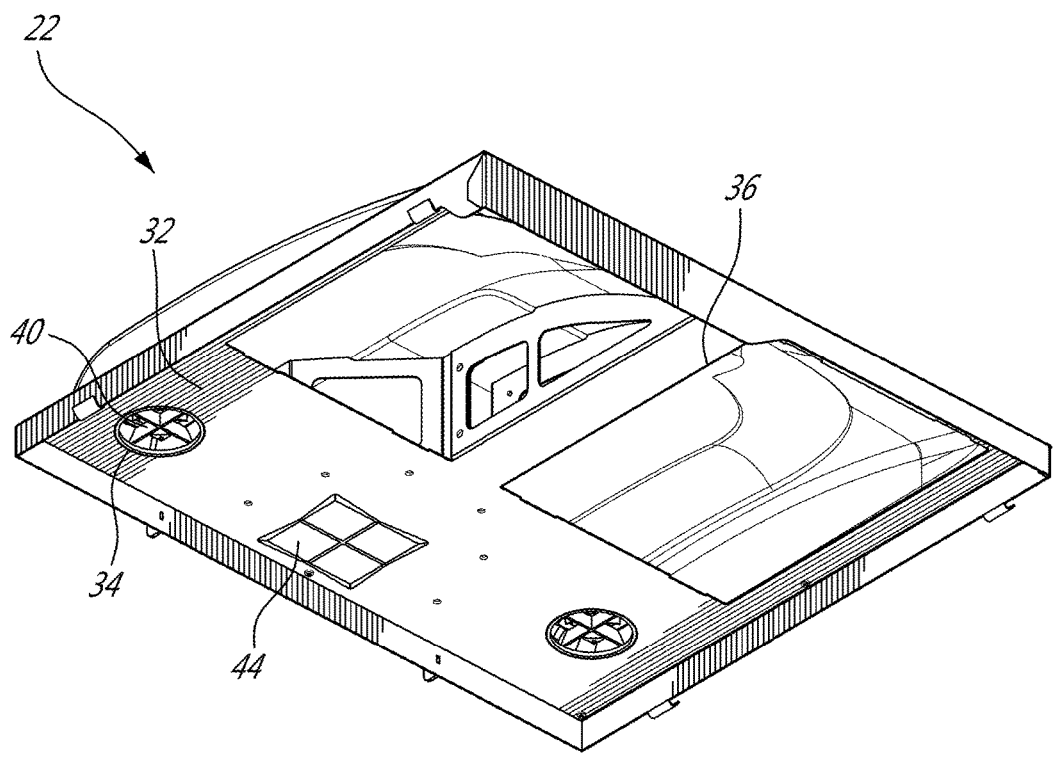
FIG. 3 is a schematic bottom tridimensional view of the cover of the filter assembly of FIG. 1.

As can be seen in FIG. 3, the cover 22 includes a bottom panel 32 with two circular holes 34 defined therethrough located and sized to each be aligned with a respective one of the fan module inlets 26 when the cover 22 is the engaged position, and one or more large openings 36 (two in the embodiment shown) located and sized to each be aligned with a respective one of the outlets 28 of the gaseous filter modules 16 when the cover 22 is in the engaged position. In a particular embodiment, the bottom panel 32 is made of metal; other materials may alternately be used. The plenum 30 is defined between the bottom panel 32 and a top wall 38 (see FIG. 1) of the cover 22. The top wall 38 of the cover 22 is arcuate to help direct and turn the flow circulating through the plenum 30. In a particular embodiment, the plenum 30 is filled with a pleated noise reducing material through which air can circulate. The cover 22 of the filter assembly 10 thus allow for the fan module(s) 20 to be disposed side-by-side with the filter modules 12, 14, 16 to minimize the height of the filter assembly 10, while providing for a diffusion of the flow therebetween allowing for a more distributed flow through the gaseous filter modules 16, which in a particular embodiment reduces preferential loading.

Figure 4:
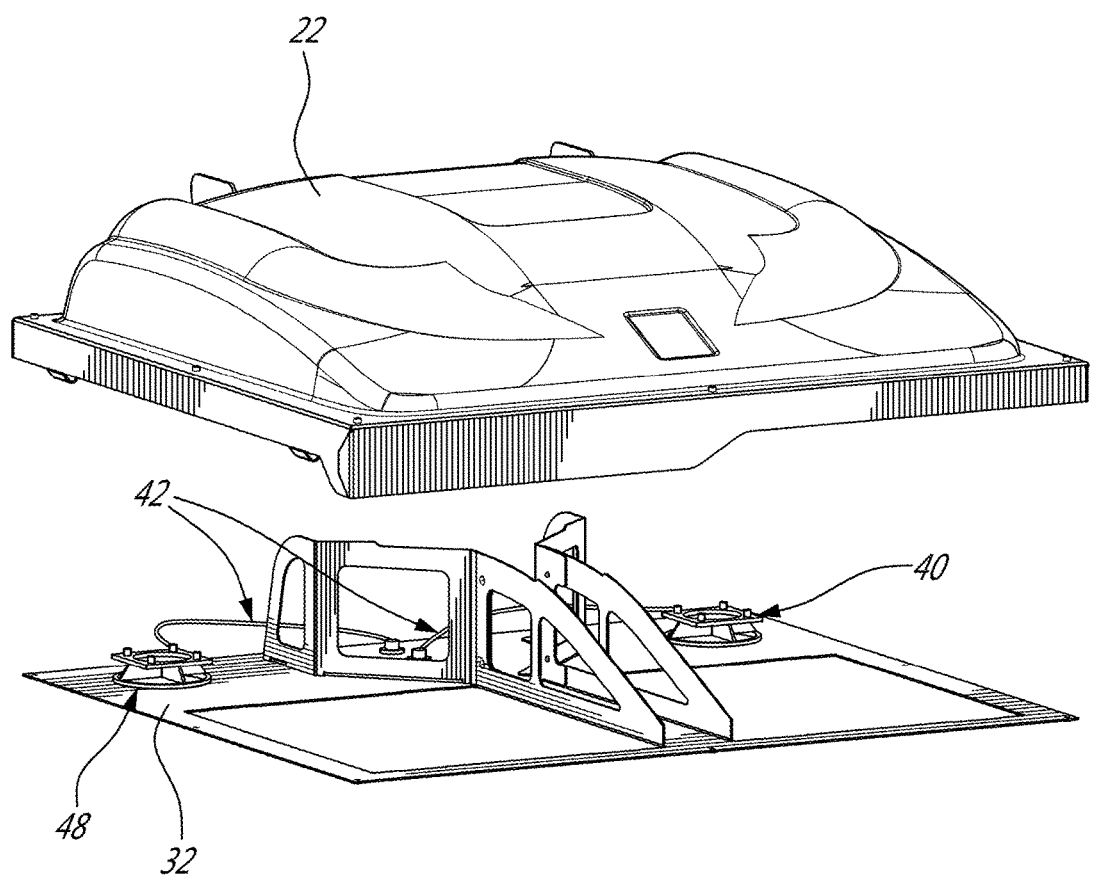
FIG. 4 is a schematic tridimensional exploded view of the cover of FIG. 3.

Referring to FIGS. 3-4, the cover 22 includes integrated sensors 40 which are placed within the plenum 30, and therefore in the airstream so that the airflow can be characterized; the sensors 40 can be of any type providing relevant information on the airflow, including, but not limited to, sensors configured to measure air velocity (e.g. thermo-anemometer, vane anemometer; manometer and pitot tube combination), to measure or detect the presence of volatile organic compounds (voc) (e.g. photo-ionization detector), to measure dust particle content (e.g. particle counter), to detect the presence of smoke and/or fine particles (e.g. smoke detector), to measure air temperature (e.g. digital thermometer), to measure relative humidity of the airstream (e.g. humidity sensor), to measure static pressure/differential pressure (e.g. manometer), to detect carbon monoxide, to measure mass flow rate (e.g. mass airflow sensor), and any combination thereof. The electronic components and wiring associated with the sensors 40 are also received within the plenum 30. In the particular embodiment shown, the sensors 40 are provided in two sensor modules, each supported by a respective holder 48 (see FIG. 4) attached to bottom panel 32 in the plenum 30 around a respective one of the holes 34 to be aligned with the respective fan module inlet 26, so that all of the flow circulated to each fan module 20 passes through the respective sensor module 40.

Through their location in the cover plenum 30, the sensors 40 are thus placed downstream of the filters 12, 14, 16; such placement allows the monitoring of the quality of the filtered air and therefore the state of efficiency of the filter assembly 10. This placement also protects the sensors 40 from fouling since the filter modules 12, 14, 16 are removing the majority of contaminants in the airstream before it reaches the sensors 40. Moreover, the airflow upstream of the fan modules 20 and downstream of the filter modules 12, 14, 16 is typically less turbulent than the exhaust airflow downstream of the fan modules 20, which in a particular embodiment allows improving or maximizing the efficiency of the sensors 40 as opposed to a placement downstream of the fan modules 20. In addition and in a particular embodiment, since the sensors 40 are placed directly above or in very close proximity to the fan module inlets 26, the air sampling at these locations are representative of the average state of the air, and not influenced by localized differences that may occur for example adjacent the face of the filter module 16 or at other locations within the cover 22.

It is understood that the sensors 40 or additional sensors may alternately be provided anywhere within the plenum 30, particularly, although not exclusively, in embodiments where localized differences in the state of the air need to be measured (for example for comparison with average state of the air).

The control system and power source of the filter assembly 10 are located within the electronics/exhaust module 18, which in the embodiment shown also has a top surface engaged to the cover 22 and in the same plane as the top surfaces of the gaseous filter modules 16 and fan modules 20. The sensors 40 are electrically connected to the control system and power source by wiring 42 (see FIG. 4) extending within the plenum 30 and connecting the sensors 40 to electrical contact(s) 44 (see FIG. 3) provided on the bottom surface of the bottom panel 32. The electrical contact(s) 44 of the cover 22 are complementary to and in alignment with electrical contact(s) 46 (FIG. 2) provided on the top surface of the electronics/exhaust module 18 and connected to the control system by suitable wiring inside the electronics/exhaust module 18. One or both of the complementary electrical contacts 44, 46 is biased toward the other so as to be connected to one another when the cover 22 is in its engaged position over the modules 16, 18, 20, such as to provide electrical power to the sensors 40 and circulate data measured by the sensors 40 to the control system. For example, one or both of the electrical contacts 44, 46 is spring loaded toward the other. Other types of biasing members may alternately be used.

It is understood that the spring loaded electrical contacts 44, 46 may be replaced with any other appropriate elements allowing electrical power to be provided to the sensors 40 and data measured by the sensors 40 to be provided to the control system. For example, cables with removable connectors could be used to connect the sensors 40 and control system. Alternately, the cover 22 could include one or more battery(ies) and a wireless transmitter connected to the sensors 40, with a complementary receiver being connected to or included in the control system. Other configurations are also possible. The sensors 40 are connected to their power source and to the control system at least when the cover 22 is in the engaged position.

While some prior art filter assemblies have removable electronic subassemblies, such assemblies are typically meant to be factory installed, and require tools and specific knowledge of the technical details of the equipment and its components to remove and reinstall the electronic subassemblies as well as to disconnect and re-connect the associated wires. Also, the electronic printed circuit boards (PCBs) are typically located in the same enclosure as the electronic subassemblies, thus making them susceptible to damage from static discharge during installation if suitable anti-static tools and protocols are not employed.

By contrast, the present cover 22 with sensors 40 creates an easily removable module that effectively and reliably allows the monitoring of the air while being a part of a modular design that allows field upgrades without the need of technically trained individuals to replace parts, without requiring any mechanical disassembly of parts within the cover, and without requiring the use of tools. For example, a multitude of cover variants with different types of sensors and/or combination of sensors can be provided and the user may easily change the sensors (as a replacement when defective, as an upgrade, for a different type of filtration, etc.) of the filter assembly 10 by simply changing the cover 22. Moreover, in a particular embodiment the cover 22 protects the sensors 40 and associated electronic components (e.g. wiring, PCBs) from static discharge because the sensors 40 and electronic components are enclosed in the plenum 30 of the cover 22 and accordingly, not directly manipulated by the user.

The configuration of the cover 22 with integrated sensors 40 thus takes advantage of a mechanical element that is intentionally designed to be easily removed from the remainder of the filter assembly 10 (cover 22), to provide for easily replacement of sensors 40 which may be connected and disconnected to the control system of the filter assembly 10 without tools, for example through the spring loaded electrical contacts 44, 46.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:
1. A filter assembly comprising:
a filter module including a filter module inlet and a filter module outlet in fluid communication with each other through a filter, a first surface of the filter module having the filter module outlet defined therein;
a fan module including a fan module inlet and a fan module outlet in fluid communication with each other through a rotatable fan, a first surface of the fan module having the fan module inlet defined therein, the first surfaces of the filter and fan modules extending side by side, and the fan module inlet and the filter module outlet being laterally spaced apart from one another;
an electronics module including a control system;
a cover movable between an engaged position where the cover engages the first surfaces of the filter and fan modules and a removed position away from the first surfaces, the cover defining a plenum, the cover in the engaged position providing a fluid communication between the filter module outlet and the fan module inlet through the plenum, the plenum directing a flow between the filter module outlet and the fan module inlet along a direction different from a direction of the flow through the fan module inlet and from a direction of the flow through the filter module outlet; and
a sensor located in the plenum and configured to provide information on the flow through the plenum, the sensor communicating with a power source and with the control system at least when the cover is in the engaged position.
2. The filter assembly as defined in claim 1, wherein the electronics module has a first surface extending side by side with the first surfaces of the filter and fan modules, the first surface including a first electrical contact connected to the control system, the cover including a second electrical contact connected to the sensor, the cover in the engaged position engaging the first surface of the electronics module with the first and second electrical contacts being connected to one another.

3. The filter assembly as defined in claim 2, wherein at least one of the first and second electrical contacts is biased toward the other.

4. The filter assembly as defined in claim 1, wherein the sensor is aligned with the fan module inlet when the cover is in the engaged position.

5. The filter assembly as defined in claim 1, wherein the first surfaces are located in a same plane.

6. The filter assembly as defined in claim 1, further comprising an additional fan module having a first surface engaging the cover in the engaged position, the additional fan module having a fan module inlet in fluid communication with the filter module outlet through the plenum when the cover is in the engaged position.

7. The filter assembly as defined in claim 1, further comprising an additional filter module having a first surface engaging the cover in the engaged position, the additional filter module having a filter module outlet in fluid communication with the fan module inlet through the plenum when the cover is in the engaged position.

8. The filter assembly as defined in claim 1, wherein the sensor is configured to perform at least one type of measurement selected from the group consisting of: measurement of velocity of the flow, measurement or detection of volatile organic compounds in the flow, measurement of dust particle content in the flow, detection of smoke in the flow, detection of fine particles in the flow, measurement of air temperature of the flow, measurement of relative humidity of the flow, measurement of static pressure of the flow, measurement of differential pressure of the flow, detection of carbon monoxide in the flow, measurement of mass flow rate of the flow.

9. A filter assembly comprising:
a filter module and a fan module disposed side by side;
a cover movable between an engaged position where the cover engages the filter and fan modules and a removed position away from the engaged position, the cover defining a plenum, the cover in the engaged position providing a fluid communication between the filter module and the fan module through the plenum, the plenum directing a flow between the filter module and the fan module along a direction different from a direction of the flow through the fan module and from a direction of the flow through the filter module; and
a sensor located in the plenum and configured to provide information on the flow through the plenum, the sensor communicating with a power source and a control system at least when the cover is in the engaged position.

10. The filter assembly as defined in claim 9, further comprising an electronics module disposed side by side with the filter and fan modules, the electronics module including a first electrical contact connected to the control system, the cover including a second electrical contact connected to the sensor, the first and second electrical contacts being connected to one another when the cover is in the engaged position.

11. The filter assembly as defined in claim 10, wherein at least one of the first and second electrical contacts is biased toward the other.

12. The filter assembly as defined in claim 9, wherein the sensor is aligned with an inlet of the fan module when the cover is in the engaged position.

13. The filter assembly as defined in claim 9, wherein the filter and fan modules have top surfaces engaging the cover in the engaged position.

14. The filter assembly as defined in claim 9, further comprising an additional fan module engaging the cover in the engaged position, the additional fan module in fluid communication with the filter module through the plenum when the cover is in the engaged position.

15. The filter assembly as defined in claim 9, further comprising an additional filter module engaging the cover in the engaged position, the additional filter module in fluid communication with the fan module through the plenum when the cover is in the engaged position.

16. The filter assembly as defined in claim 9, wherein the sensor is configured to perform at least one type of measurement selected from the group consisting of: measurement of velocity of the flow, measurement or detection of volatile organic compounds in the flow, measurement of dust particle content in the flow, detection of smoke in the flow, detection of fine particles in the flow, measurement of air temperature of the flow, measurement of relative humidity of the flow, measurement of static pressure of the flow, measurement of differential pressure of the flow, detection of carbon monoxide in the flow, measurement of mass flow rate of the flow.

* * * * *